United States Patent [19]

Broders

[11] Patent Number: 5,600,694
[45] Date of Patent: Feb. 4, 1997

[54] NUCLEAR FUEL UPPER END FITTING QUICK DISCONNECT JOINT

[75] Inventor: Richard P. Broders, Granby, Conn.

[73] Assignee: Combustion Engineering, Inc., Windsor, Conn.

[21] Appl. No.: 393,102

[22] Filed: Feb. 22, 1995

[51] Int. Cl.⁶ ..................................................... G21C 3/32
[52] U.S. Cl. ........................ 376/446; 376/449; 376/438; 376/448; 376/451; 376/364; 376/439
[58] Field of Search .................................. 376/446, 449, 376/438, 448, 451, 364, 439; 976/DIG. 65, DIG. 68

[56] References Cited

U.S. PATENT DOCUMENTS

| Re. 31,583 | 5/1984 | Klumb et al. | 376/364 |
|---|---|---|---|
| 3,770,583 | 11/1973 | Klumb et al. | 376/449 |
| 4,265,708 | 5/1981 | Lawrence | 376/352 |
| 4,684,499 | 8/1987 | Gjertsen | 376/446 |
| 4,716,004 | 12/1987 | Merkousky et al. | 376/203 |
| 4,966,747 | 10/1990 | Tower et al. | 376/254 |
| 4,983,351 | 1/1991 | Tower et al. | 376/254 |
| 5,268,948 | 12/1993 | Church et al. | 376/446 |

Primary Examiner—Charles T. Jordan
Assistant Examiner—Meena Chelliah
Attorney, Agent, or Firm—John H. Mulholland

[57] ABSTRACT

A fuel assembly for use in a pressurized water nuclear reactor includes an assembly having guide tubes joined at their upper ends to posts having heads against which is biased a holddown plate spaced from a flow plate. The holddown plate is slidably mounted on the posts. The flow plate is fixed to the posts. The joints have one either post or tube member with spring fingers with projecting steps to lock in abutting relation behind the flow plate with a ring projection on the other captured in a recess in the adjacent finger surfaces. This structure provides a quick connect joint between the tube and the post.

6 Claims, 3 Drawing Sheets 5,600,694

NUCLEAR FUEL UPPER END FITTING QUICK DISCONNECT JOINT

BACKGROUND OF THE INVENTION

1. Field of the Invention

The present invention relates to fuel assemblies for Pressurized Water (PWR) nuclear reactors and more particularly to such assemblies which may be easily disassembled and reassembled to permit removal and insertion or fuel or burnable poison rods within the assembly.

This invention relates to an improved joint connection between the guide tubes and the upper end fitting of a nuclear reactor fuel assembly. The design of the connection offers advantages over existing designs because or its reduced cost, the simplicity of the components, and the accomplishment of a quick disconnection procedure with fewer components.

2. Description of the Prior Art

Modern PWR fuel assemblies conventionally contain a skeleton which includes a lower end fitting, an upper end fitting and guide tubes therebetween upon which nuclear fuel rod and burnable poison rods are intermediately and spatially supported by means of a plurality of spacer grids mounted on the guide tubes.

It is known that it is advantageous to provide the fuel assemblies with guide tube/upper end fitting joints such that defective fuel rods may be replaced or burnable poison rods added after the assembly has been irradiated. This may preclude having to prematurely remove a fuel assembly from a reactor because of a few defective fuel rods. Many prior art PWR fuel assemblies have been designed with this rod replaceability in mind by providing joints between the upper end fitting and the guide tubes which may be disassembled to remove the upper end fitting and permit removal and insertion of fuel and poison rods.

The upper end fitting of a PWR nuclear fuel assembly performs several functions. It provides a grappling location for a lifting apparatus, it precisely locates the upper end of the assembly in the reactor core, and it provides reaction surfaces for springs which are used to restrain the fuel assembly from lifting under flow conditions in the reactor. As mentioned above, the upper end fitting is also designed to be remotely removable from the ends of guide tubes of the fuel assembly to provide access to the upper ends of the fuel rods.

Examples of designs to provide this latter function are shown in U.S. Pat. Nos. 4,030,975; 4,631,168; and 5,363,423. Drawbacks to all of these prior art designs are that each of the connections of the upper end fitting to the guide tubes (up to 24 joints) requires an individual disassembly operation such as unthreading, locking sleeve removal, etc. to be performed, in an irradiated environment. In some cases, U.S. Pat. No. 4,631,168, for example, small parts must be carefully contained during the periods when the joints are disassembled and trying to be reassembled.

Remote disassembly of the design shown in U.S. Pat. No. 4,030,975 involves unthreading the outer posts (thereby overcoming the resistance supplied by the distortion of the thin-walled region) and removing the upper end fitting. The outer posts sometimes require replacement at this point. Reassembly involves putting the upper end fitting back on the guide tubes, inserting and threading in the outer posts, and then re-expanding the thin-walled region of the outer posts in situ by a process that involves separate tooling.

SUMMARY OF THE INVENTION

The invention, briefly stated, is a fuel assembly for use in a pressurized water nuclear reactor which includes an assembly having guide robes joined at their upper ends to posts having heads against which is spring biased a holddown plate spaced from a flow plate. The holddown plate is slidably mounted on the posts and the plates are separated by springs. The flow plate is fixed to the posts. The joints have one either post or tube member with spring fingers with projecting steps to lock in abutting relation behind the flow plate with a ring projection on the other captured in a recess in the adjacent finger surfaces. This structure provides a quick connect joint between the tube and the post.

With the structure of the illustrated invention, the disassembly is accomplished by compressing the holddown springs an additional incremental amount (as above) and then lifting the entire upper end fitting, causing the post fingers to again flex outward over the enlarged region of the guide tubes. Reassembly is done by merely placing the upper end fitting back over the guide tubes while the holddown springs are compressed by the additional incremental amount and then releasing the additional compression. No secondary operations, such as re-expanding, are required.

Moreover, there is an advantage of the novel device of the invention in its simplicity of components. The design shown in U.S. Pat. No. 4,030,975 includes a guide tube flange that is welded to the guide tube and then machined with threads, undercuts, and holes for locking the expanded post skirt. The new structure merely needs an enlarged region or ring in the guide tube itself. The design shown in U.S. Pat. No. 4,030,975 has a post design that has complicated machining at the bottom end which includes threads, undercuts, and a thin-walled skirt region that is susceptible to damage. It also requires a separate expansion process to be performed to secure the post against rotation during operation. The device of the invention has posts that have some basic preliminary machining done and they are then slotted at the bottom end to create the flexible fingers. The flow plates of both designs have through holes, counterbores, and lead-in angles, but the flow plate associated with the device of the invention has fewer intricately machined features and generally larger tolerances on the features.

The device of the invention also compares favorably to other designs, U.S. Pat. No. 4,631,168, for example, with regard to its simplicity since the other designs include considerable machining, have extra pieces for securing and locking the joint, and need an additional operation to secure the locking structure in place.

DETAILED DESCRIPTION OF THE DRAWINGS

Figure 1:
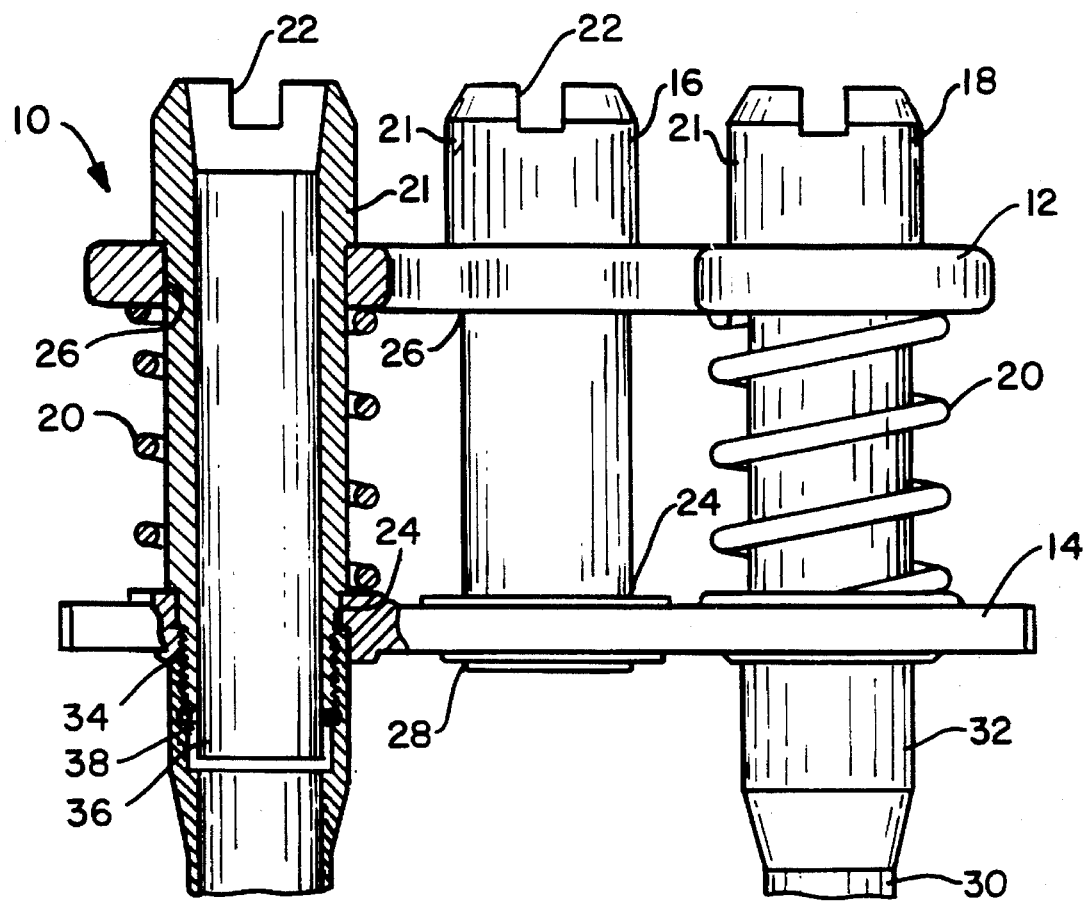
FIG. 1 is an elevational view partially in cross-section of one typical prior art upper end fitting/guide tube connection.

The typical prior art upper end fitting construction of FIG. 1 is generally designated by the numeral 10. The end fitting 10 includes a subassembly comprising a holddown plate 12, a flow plate 14, a center post 16, and four outer posts 18, each with a holddown spring 20 surrounding it. The four outer posts are free to slide vertically within the subassembly and include heads 21 with slots 22 to drive them rotationally by means of tooling from above.

The subassembly is assembled by positioning the holddown springs 20 in register over holes 24 in the flow plate 14, placing the holddown plate 12 on top of the holddown springs 20, and then passing the lower end of the center post 16 through the center hole 26 in the holddown plate 12, through a center holddown spring 20 (if there is one), and threading it into the flow plate 14, while compressing the springs 20, by means of a threaded lower portion of hole 24 to make a permanent threaded connection 28. This subassembly is self-contained with a preload built into the holddown springs 20.

The upper end fitting 10 is installed on the prior art fuel assembly of FIG. 1 by placing the subassembly on the outer guide tubes 30 and the outer posts 18 are then passed through the holes 26 in the holddown plate 12, through the outer holddown springs 20, through the hole 24 in the flow plate 14 and threaded into the internally threaded flange portion 32 of guide tubes 30 to make a removable threaded connection 34.

The outer posts 18 have thin-walled skirt regions 36 adjacent and below the removable threaded connection 34 which are expanded into holes 38 in the guide tubes' 30 flanges 32 to prevent the posts 18 from backing out due to coolant flow induced vibration.

Figure 2:
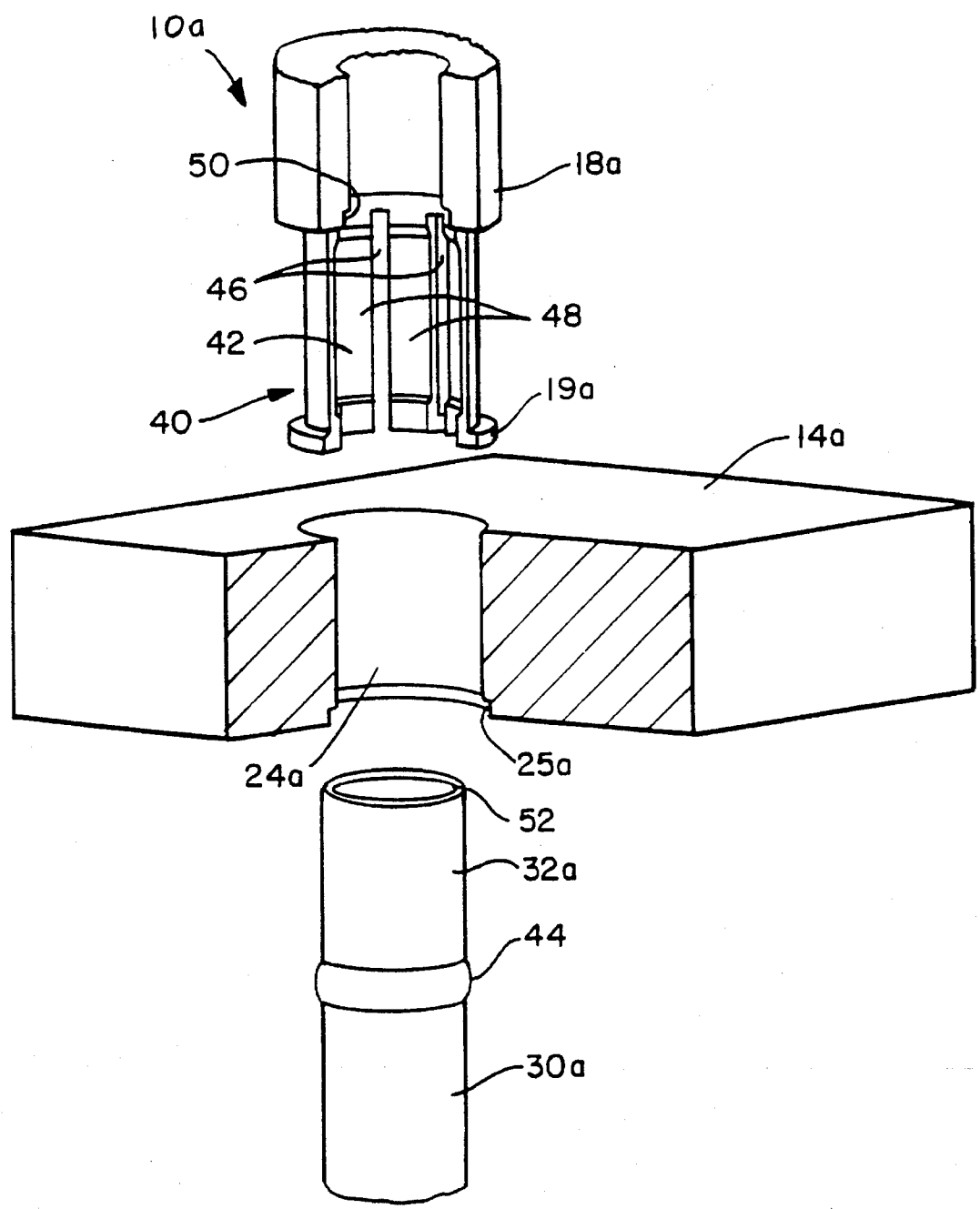
FIG. 2 is an exploded view of an upper end fitting/guide tube connection that employs the combination and includes the advantages on the instant invention.
Figure 3:
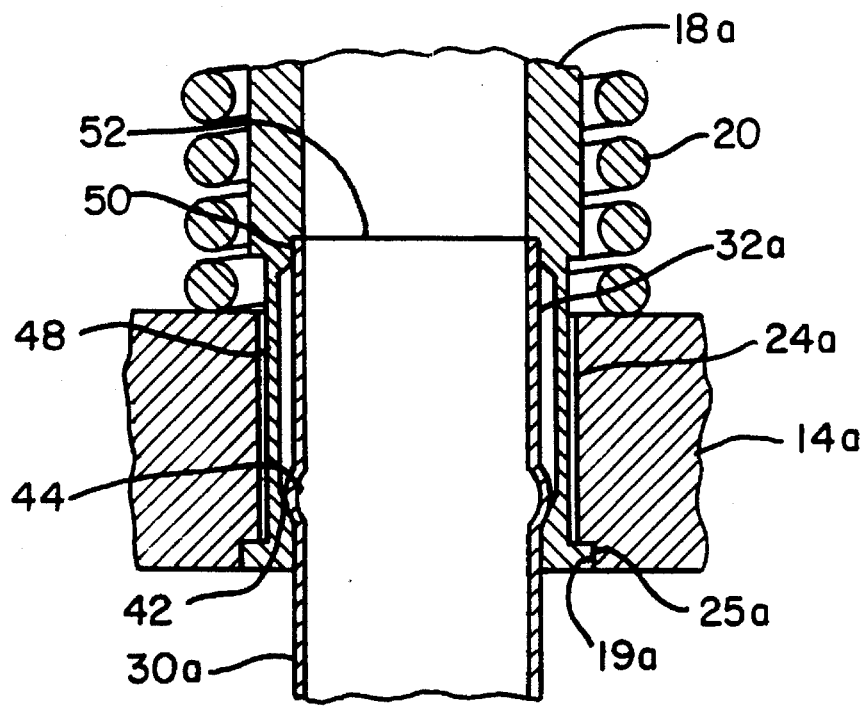
FIG. 3 shows the assembled joint of FIG. 2 in a cross-sectional elevation view.

The present invention, as illustrated in FIGS. 2 and 3, for example, provides an improved joint connection between the guide tubes 30 and the upper end fitting 10 of a nuclear reactor fuel assembly. The design of this novel connection offers advantages over existing designs because of its reduced cost, the simplicity of its relatively few components and the provision of a quick disconnection capability.

As seen in FIGS. 2 and 3, the upper end fitting 10*a* of a PWR fuel assembly is constructed according to the principals of the invention, which in a preferred embodiment, utilizes a quick disconnect upper end fitting joint and has a structure in which the upper portion 32*a* of the guide tube 30*a* fits inside the lower region 40 of the post 18*a*. The guide tube 30*a* includes an expanded region, and is circumferentially intact, i.e. it is not slotted in a direction parallel to its axis. FIGS. 2 and 3 show that a slotted lower end of the post 18*a* fits between the flow plate 14*a* and the guide tube 30*a*. Post 18*a* has an inside diameter portion 42 which is recessed to receive the expanded ring portion 44 of guide tube 30*a*. Region 40 of post 18*a* is slotted at 46 to allow the "fingers" 48 to flex inward when assembling or joining the novel upper end fitting assembly 10*a* by inserting the post through the flow plate 14*a* and outward when attaching or detaching the upper end fitting 10*a* from the guide tubes 30*a*. The through hole 24*a* in the flow plate has considerable clearance to the post 18*a* while the counterbore 25*a* on the bottom side of the flow plate 14*a* has a tight clearance to the larger diameter portion 19*a* at the bottom of the posts's fingers 48. The holddown plate 12 and holddown springs 20, not fully shown in FIGS. 2 and 3, are of a standard design.

Numerous variations are possible while maintaining the basic concept of the quick disconnect upper end fitting joint. These variations include, but are not limited to, having an annular ring projection incorporated into the post fingers 48 that project into a recess on the guide tube or having the guide tube sandwiched between the flow plate and the post. In this latter variation, the upper region of the guide tube (or a separate extension component attached to the guide tube below the connection) is slotted (note that both possibilities of which component is recessed are available with this configuration) and the quick simplified disconnect joint is still present.

For upper end fittings employing the new quick connect device, the subassembly components are unchanged from the prior art structure of FIG. 1 except for the machining of the flow plate holes to be compatible with the new outer posts 18*a*. Prior to installing the subassembly on the fuel assembly guide tubes 30*a*, the holddown plate 12 would be pressed toward the flow plate 14 to compress the holddown springs 20 an additional incremental amount and the new outer posts 18*a* would be installed by passing them through the holes 26 in the holddown plate 12, through the holddown springs 20, and then through the holes 24 in the flow plate 14. Since the hole 24 through the flow plate 14 is smaller than the step 19*a* at the bottom of the post 18*a*, the fingers 48 at the bottom of the post 18*a* would flex inward at this point. Once the step 19*a* on the post passed through the reduced diameter of hole 24 of the flow plate 14*a*, the fingers 48 would spring back to their normal diameter. After all four outer posts 18*a* are in place, the additional compression of the holddown springs would be removed, allowing the flow plate 14*a* to seat on the step 19*a* at the bottom of the fingers 48. As before, the holddown springs 20 are preloaded, but instead of being preloaded across the center post 16, with the new device, they are preloaded across the outer posts 18*a* between their heads 21 and the steps 19*a* on the fingers 48. This all results in the upper end fitting assembly 10*a* being a stand-alone assembly without any free components.

To secure the upper end fitting assembly 10*a* to the guide tubes 30*a*, the holddown springs are compressed an additional incremental amount by pulling upward on the flow plate 14, preferably through the center post 16, and pushing downward on the tops of the outer posts 18*a*. This results in the steps 19*a* at the bottom of the post fingers 18*a* being displaced axially below the flow plate 14*a*. The upper end fitting assembly 10*a* can now be lowered over the four outer guide tubes 30*a* with the expanded regions or rings 44 of the guide tubes 30*a* flexing the fingers 48 of the outer posts 18*a* outward as the projecting rings 44 pass the lower ends of the fingers. When the expanded regions or rings 44 reach the recessed regions 42 on the inside of the outer post 18*a* fingers 48, the fingers 48 would again spring back to their normal position.

In the embodiment shown in FIGS. 2 and 3, I.D. shoulders 50 on the outer posts 18a would come to rest on the top 52 of the guide tubes 30*a*, at which point the additional compression of the holddown springs 20 would be removed, allowing the flow plate 14*a* to once again seat on the step 19*a* at the bottom of the post fingers 48 (FIG. 3).

The components are sized such that the clearances between the counterbore 25*a* on the flow plate 14*a*, the step 19*a* on the post 18*a* fingers 48, the enlarged region or ring 44 of the guide tube 30*a*, and the normal diameter of the guide tube 30*a* below the enlarged region or ring 44 precludes the passage of the enlarged guide tube region or ring 44 in through the lower region or portion 40 of the outer posts 18*a* while the counterbore 25*a* of the flow plate 14*a* hole 24*a* radially constrains the post fingers 48.

Figure 4:
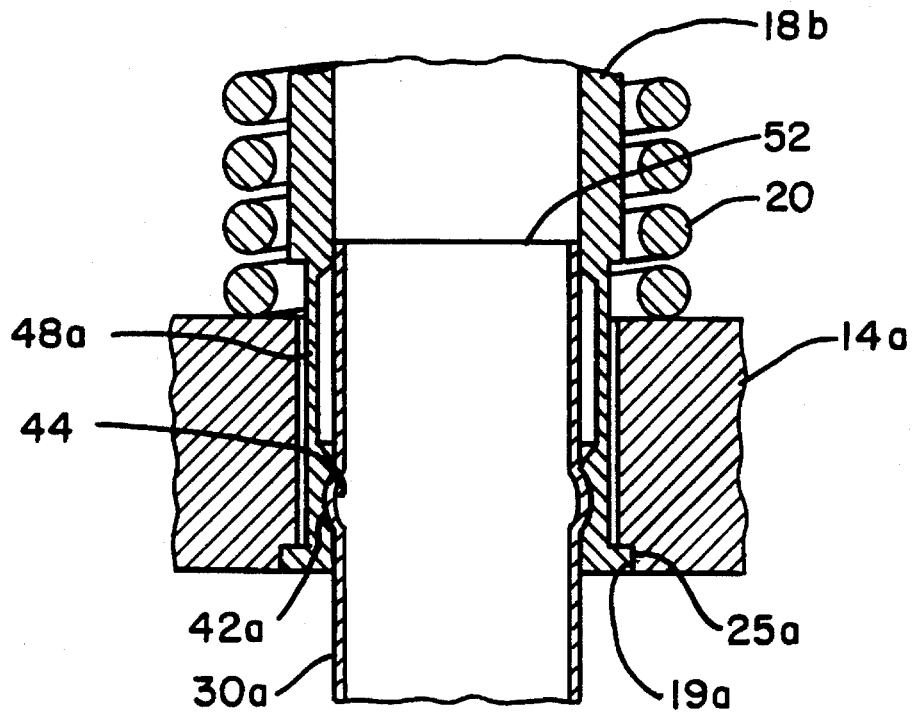
FIG. 4 is a view similar to FIG. 3 of an embodiment of the invention.

As shown in FIGS. 2 and 3, the upper end fitting 10*a* rests on the top 52 of the guide tubes 30*a*. With that embodiment, the holddown load in the nuclear reactor is carried through the fingers 48 to the top 50 of the guide tube. In another embodiment, shown in FIG. 4, the recess 42*a* on the inside of the fingers 48a are such that the holddown load in the PWR reactor is carried through the fingers 48a to the upper side of the enlarged region or ring 44 of the guide tube 30a. In either embodiment, any lifting load on the bundle assembly is carried through the under side of the enlarged region or ring 44, into the fingers 48 or 48a, and then into the post head 21.

Thus, it will be seen that the structure of the invention provides advantages which include ease of operation in that all joints are loosened or tightened simultaneously and, compared to other quick release designs, the quick disconnect feature is achieved without additional pieces being required. Both of these advantages are accomplished by utilizing the existing and ever-present holddown spring force as the means of locking the joint together. Compared to designs using threaded connections, the device is faster and easier to remotely assemble and disassemble. Compared to other quick disconnect designs, the device releases all connections at once and does not require the removal, handling, or reinstallation of any locking features since they are built into the design in the form of the flow plate and holddown springs.

Moreover, it will be seen, therefore, that an improved joint between the upper end fitting assembly and the guide tubes is provided. The device includes a quick disconnect feature that does not require additional components and can release the entire upper end fitting assembly in one operation. The preferred embodiment is shown in FIGS. 2 and 3, but numerous variations are possible. These include, but are not limited to, the upper region of the guide tube being an additional piece (possibly stainless steel), the tube guide tube section being slotted and fitting between the flow plate and the post, and the orientation of the recess being either toward the guide tube centerline or away from it, as well as its being in either the guide tube or the post.

I claim:

1. A fuel assembly for use in a pressurized water nuclear reactor, said assembly having a plurality of guide tube members each joined at its upper end to one of a plurality of post members with each of said post member having a head portion against which is spring biased a first horizontally oriented plate spaced from a second horizontally oriented plate, said first plate being slidably mounted by holes therein on said post members, and said second plate being fixed to said post members, springs surrounding said post members and abutting said first and second plates, said fuel assembly being characterized by:

each said post member and guide tube member joint including one of said post or tube members with slots parallel to its axis to form flexible spring fingers with a projecting step on the ends thereof for abutting engagement with said second plate and further one of said members including a projection for being retained in a recess in the other of said members in the surface portion adjacent to said one of said members to permit locking said members together or unlocking said members when said spring fingers steps are free of said abutting engagement with said second plate and said spring fingers are thus free to flex, said spring fingers steps being disengageable from said abutting engagement with said second plate by compressing said springs to move said first and second horizontal plates towards each other.

2. The fuel assembly of claim 1 in which the first horizontally oriented plate is a holddown plate.

3. The fuel assembly of claim 1 in which the second horizontally oriented plate is a flow plate.

4. The fuel assembly of claim 1 in which the one of said post or tube members with slots is said post member.

5. The fuel assembly of claim 1 in which the one of said post or tube members with a projection for being retained in a recess in the other of said members in the surfaced portion adjacent thereto is said tube member.

6. The fuel assembly of claim 5 in which said projection for being retained in a recess in the other of said members in the surface portion adjacent thereto is an annular ring on said tube member.

* * * * *